(12) United States Patent
Ben Bakir et al.

(10) Patent No.: US 7,881,571 B2
(45) Date of Patent: Feb. 1, 2011

(54) COUPLING DEVICE WITH COMPENSATED BIREFRINGENCE

(75) Inventors: Badhise Ben Bakir, Grenoble (FR); Alexei Tchelnokov, Meylan (FR)

(73) Assignee: Commissariat A l'Energie Atomique, Paris (FR)

( * ) Notice: Subject to any disclaimer, the term of this patent is extended or adjusted under 35 U.S.C. 154(b) by 27 days.

(21) Appl. No.: 12/491,767

(22) Filed: Jun. 25, 2009

(65) Prior Publication Data

US 2010/0172615 A1 Jul. 8, 2010

(30) Foreign Application Priority Data

Jul. 2, 2008 (FR) .................. 08 54489

(51) Int. Cl.
G02B 6/34 (2006.01)
G02B 6/10 (2006.01)
G02B 6/30 (2006.01)
H01L 21/00 (2006.01)
C23F 1/00 (2006.01)

(52) U.S. Cl. ............... 385/37; 385/49; 385/129; 385/130; 385/131; 438/29; 438/31; 438/32; 216/24

(58) Field of Classification Search .......... 385/37, 385/31, 129, 130, 131, 132, 49, 122; 438/29, 438/31, 32; 216/24
See application file for complete search history.

(56) References Cited

U.S. PATENT DOCUMENTS 5,760,960 A * 6/1998 Lin et al. ................. 359/569
6,606,432 B2 * 8/2003 Gaylord et al. ............ 385/37
7,043,121 B2 * 5/2006 De Groot .................. 385/37
7,065,272 B2 6/2006 Taillaert et al. ........... 385/37
7,356,224 B2 * 4/2008 Levner et al. ............. 385/37
7,434,940 B2 * 10/2008 Allman et al. ............ 353/85
7,704,644 B2 * 4/2010 Schneider et al. ........ 430/1
2001/0031114 A1 * 10/2001 Kashyap .................. 385/37
2005/0146789 A1 7/2005 Wegmann et al. ........ 359/486
2007/0070276 A1 3/2007 Tan et al. ................ 349/117
2007/0097470 A1 * 5/2007 Schneider et al. ........ 359/10
2010/0172615 A1 * 7/2010 Ben Bakir et al. ........ 385/49

FOREIGN PATENT DOCUMENTS

EP   1 353 200 A    10/2003
EP   1 353 200 A2   10/2003

* cited by examiner

Primary Examiner—Brian M Healy
(74) Attorney, Agent, or Firm—Miles & Stockbridge P.C.

(57) ABSTRACT

The invention relates to a coupling device comprising a support substrate; a first layer arranged on the support substrate and comprising first patterns produced within the thickness of said first layer, said first patterns being arranged in parallel and periodic rows; a second layer arranged on the first layer and comprising second patterns passing through the thickness of said second layer, said second patterns being arranged in parallel and periodic rows. The direction of periodicity of the rows of the first patterns is perpendicular to the direction of periodicity of the rows of the second patterns. The rows of the first patterns extend over a distance greater than or equal to the wavelength in the void of the optical wave intended to be coupled. The first patterns have a width less than or equal to a tenth of the wavelength of the optical wave intended to be coupled, and the period of these patterns is between 50 nm and 1 μm. The second patterns are arranged so as to form a periodic diffraction grating.

29 Claims, 4 Drawing Sheets

COUPLING DEVICE WITH COMPENSATED BIREFRINGENCE

TECHNICAL FIELD

The invention relates to a coupling device, as well as to the manufacturing method thereof, the coupling device being polarization-insensitive.

PRIOR ART

In the field of optoelectronics, planar optical waveguides are widely used.

In these planar optical waveguides, it is indeed possible to produce complex optical beam management functions such as multiplexing, demultiplexing, modulation, spectral routing . . . .

These functions can also be dedicated to both very short-distance optical links, on the scale of a millimeter (e.g., as for intra-chip communication), as well as to very long-distance optical links, of the order of several km (e.g., as in the metropolitan area network).

It is possible to integrate a high density of such optical functions compactly, on a single chip. To accomplish this, it is necessary to miniaturize the optical circuits, which results in likewise miniaturizing the cross-section of the optical waveguides, in which the optical circuits are produced, to sub-micronic dimensions.

For average and long-distance applications (i.e., for distances of a few meters to several kilometers), the preferred optical transport medium between two planar waveguide optical circuits is the optical fiber.

The problem is that the dimensions of the cross-section of an optical fiber remain large (from ten to a few tens of micrometers) in comparison with the cross-section of the planar waveguides. Therefore, optical fibers cannot be directly connected to a planar waveguide, but are connected by a device called a coupling device. This coupling device must be capable of compensating for the dimensional mismatch between the planar waveguide and the optical fiber.

One known solution for coupling an optical fiber and a planar waveguide optical circuit consists in producing a diffraction grating 210 on a surface of the planar waveguide 200 and in causing light to penetrate into or exit from the planar waveguide by means of this diffraction grating (see FIG. 1).

The disadvantage of this solution is that the optimal angle of incidence $\theta$ for coupling the light is different for the two polarizations. As a matter of fact, the optimal angle of incidence $\theta$ for coupling corresponds to the angle of diffraction of a guided mode propagating in the planar waveguide. It is defined by the formula:

$$n_{\mathit{eff}} = \sin\theta + m.(\lambda/\Lambda)$$

where m is the diffraction order, $\lambda$ is the wavelength of the incident light, $\Lambda$ is the period of the diffraction grating and $n_{\mathit{eff}}$ is the propagation constant of a mode in the planar waveguide 200.

Such being the case, the propagation constant of a mode $n_{\mathit{eff}}$ in a planar waveguide differs according to the polarization. The optimal angle of incidence $\theta$ is therefore different for the two polarizations.

This problem is inherent to the asymmetry of the cross-section of planar waveguides. Due to this asymmetry, planar waveguides are sensitive to the polarization of light (optical waveguides are said to be birefringent). It is recalled that birefringence is conventionally defined as being the difference between the effective indices assigned to the polarizations TE (Transverse Electric) and TM (Transverse Magnetic):

$$B = n_{TE} - n_{TM}$$

Conventionally, on a waveguide produced in a given plane, the polarization states TE and TM are defined such that:

TE corresponds to the electric field parallel to the plane of the waveguide and to the magnetic field which is perpendicular to the plane of the waveguide, TM corresponds to the magnetic field parallel to the plane of the waveguide and to the electric field which is perpendicular to the plane of the waveguide.

Thus, since the waveguides are very sensitive to the polarization state of light, it is preferable to couple them with devices in which the polarization state is known and controlled.

Such being the case, the polarization state of an optical signal conveyed in an optical fiber is a random quantity which changes continuously over time.

It is therefore impossible to directly connect a planar optical waveguide to an optical fiber. A coupling device, which is light polarization-independent, must be interposed between the optical fiber and the planar waveguide.

Such a coupling device is known from document [1], cited at the end of this description, which enables an optical fiber and a planar waveguide to be coupled, while at the same time being light polarization-independent.

This coupling device includes two planar waveguides 250, 260, which are arranged on a substrate 300 and which intersect at a right angle, and a diffraction grating 190 formed at the intersection of the two planar waveguides (see FIG. 2). The light arrives on the grating by means of an optical fiber 310. This coupling device separates one optical mode into two identical optical modes of different polarization, each going into a planar waveguide 250, 260 and each having a different state of polarization TE or TM.

In this case, each of the two polarizations must be processed by a separate nanophotonic circuit 350, 340, which makes it necessary to double the number of required nanophotonic circuits. The two polarization states are then redirected towards the respective planar waveguide thereof 380, 390 and the coupled light emerges through the diffraction grating 370 (situated at the intersection of the two waveguides 380 and 390) into the optical fiber 360.

Thus, not only does the solution proposed in document [1] have the disadvantage of doubling the complexity of the final device, but, in addition, for reasons of symmetry, the two nanophotonic circuits 350, 340 must be completely identical.

The inventors have therefore sought to simplify the existing coupling devices and to thereby design a coupling device which enables a light to be coupled, e.g., from an optical fiber towards an optical waveguide, while at the same time being polarization-independent.

DISCLOSURE OF THE INVENTION

This objective is achieved by an optical coupling device intended for optically coupling an optical wave of a first optical component towards a second optical component, said coupling device comprising:

a support substrate, a first layer arranged on the support substrate and comprising first patterns produced within the thickness of said first layer, said first patterns being arranged in parallel and periodic rows, a second layer arranged on the first layer and comprising second patterns passing through the thickness of said second layer, said second patterns being arranged in parallel and periodic rows, in which the direction of periodicity of the rows of the first patterns is perpendicular to the direction of periodicity of the rows of the second patterns, in which the rows of the first patterns extend over a distance greater than or equal to the wavelength in the void of the optical wave intended to be coupled, in which the first patterns have a width less than or equal to a tenth of the wavelength of the optical wave intended to be coupled, and the period of these first patterns is between 50 nm and 1 µm, the width being the dimension of a pattern in the direction of periodicity, and in which the second patterns are arranged so as to form a periodic diffraction grating.

Advantageously, and for working wavelengths relating to current telecommunications applications (1.3-1.8 µm), the diffraction grating formed by the second patterns has a period of between 300 nm and 1 µm.

The particular structuring of the first layer makes it possible to render the coupling device insensitive to polarization while compensating for the birefringence of said first layer.

The optical wave intended to be coupled advantageously has a wavelength of between 0.8 µm and 10 µm.

The first layer advantageously has a thickness less than or equal to 10 micrometers. More particularly, the first layer can advantageously have a thickness of between 1 micrometer and 50 nanometers.

The first patterns advantageously have the same depth.

The first patterns are advantageously produced throughout the entire thickness of the first layer.

The first and second patterns are advantageously protuberances and/or recesses.

According to a first embodiment, the protuberances are chosen from amongst columns or ribs.

According to another embodiment, the recesses are chosen from amongst holes or slots.

The protuberances or the recesses advantageously have a cross-section chosen from amongst a circular cross-section, a square cross-section or a rectangular cross-section.

All of the first and/or second patterns of a single row advantageously have the same width.

At least one row amongst the rows of first and second patterns advantageously comprises a single pattern, this pattern being a rib or a slot.

All of the rows of the first and/or second patterns advantageously comprise a single pattern, the pattern being a slot or a rib.

The first patterns of the first layer are likewise advantageously present in the second layer.

According to one embodiment, the second patterns are columns or holes having different diameters a and b, the columns or holes of diameter a and the columns or holes of diameter b being in separate rows, and the rows of patterns of diameter a and the rows of patterns of diameter b being repeated periodically. The repetition of the rows of second patterns of diameter a and of diameter b enable a period diffraction grating to be formed (see FIG. 5).

The first patterns are advantageously filled with a fluid or a solid material which is different from the material of the first layer.

The second patterns are advantageously filled with a fluid or a solid material which is different from the material of the second layer.

The solid material used to fill the first patterns and/or second patterns is advantageously chosen from amongst the oxides (e.g., $SiO_2$, $TiO_2$ ...) or the nitrides (e.g., $Si_3N_4$ ...).

The optical coupling device further advantageously includes a reflecting structure placed between the support substrate and the first layer, this reflecting structure being chosen from amongst a Bragg mirror, a layer of metal or a photonic crystal layer. The presence of this reflecting layer makes it possible to increase the coupling ratio of the coupling device.

The coupling device according to the invention enables two optical components to be coupled. It is particularly useful for coupling two optical components which are in planes oriented in relation to one another, e.g., in planes oriented at an angle of between 45° and 90°. The first optical component can be an optical fiber and the second optical component can be an optical waveguide.

The invention likewise relates to an optical circuit comprising an optical coupling device as described above, as well as a planar optical waveguide, said planar optical waveguide being contiguous with the first layer of the coupling device.

The invention likewise relates to a method of producing such a coupling device. This production method includes the following steps:

supplying a support substrate, supplying a first layer on the support substrate, said first layer comprising first patterns, supplying a second layer on the first layer, said second layer comprising second patterns.

The first and the second layers can be made of a single material or of different materials.

According to a first embodiment, the first (second) layer comprising the first (second) patterns is supplied by depositing the first (second) layer and by etching the first (second) patterns into said first (second) layer.

According to a second embodiment, the first layer comprising the first patterns and the second layer comprising the second patterns are supplied by depositing one and the same layer on the support substrate, by etching the first patterns into the thickness of the layer, and then by etching the second patterns on the surface of the layer.

Finally, the invention relates to a method of producing an optical circuit comprising a coupling device as described above, as well as a planar waveguide. The method of producing such an optical circuit includes the following steps:

a) supplying a support substrate, b) supplying a first layer on the support substrate, said first layer including a region comprising the first patterns, c) supplying a second layer on the region of the first layer, said second layer comprising the second patterns.

According to a first embodiment, step b) is carried out by depositing a first layer on the support substrate and by etching the first patterns into said first layer, and step c) is carried out by depositing a second layer on the region of the first layer comprising the first patterns and by etching the second patterns into said second layer.

According to a second embodiment, steps b) and c) are carried out by depositing a layer on the support substrate, by etching the first patterns into the thickness of said layer, by surface-etching the second patterns in a region of the layer and by surface-etching the remainder of the second layer.

According to a third embodiment, step b) is carried out by depositing a first layer on the support substrate and by etching the first patterns into a region of said first layer, and step c) is carried out by depositing a second layer, by etching the second patterns into a region overhanging the region of the first layer and by completely etching the second layer outside of said region of the second layer.

BRIEF DESCRIPTION OF THE DRAWINGS

The invention will be better understood and other advantages and features will become apparent upon reading the following description given for non-limiting illustrative purposes, and accompanied by the appended drawings, in which.

It should be noted that the thicknesses of the layers in these figures are not to scale.

DETAILED DISCLOSURE OF PARTICULAR EMBODIMENTS

As see above, the coupling device, according to the chosen patterns, can have various configurations.

Figure 1:
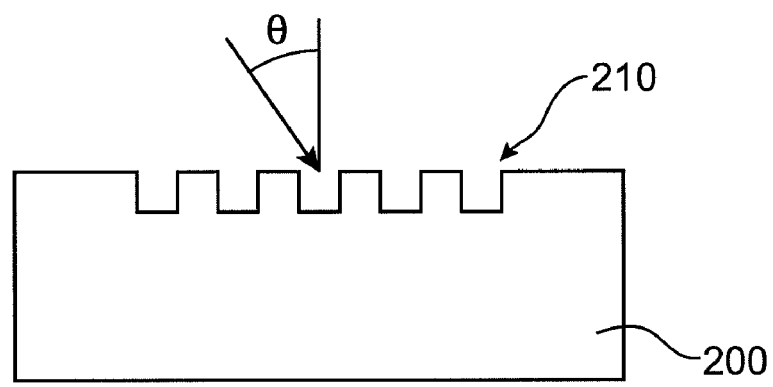
FIG. 1, which was already described above, shows a sectional view of a diffraction grating made in a known optical waveguide of the prior art, FIG. 2, which was already described above, shows a top view of a known coupling device of the prior art.
Figure 2:
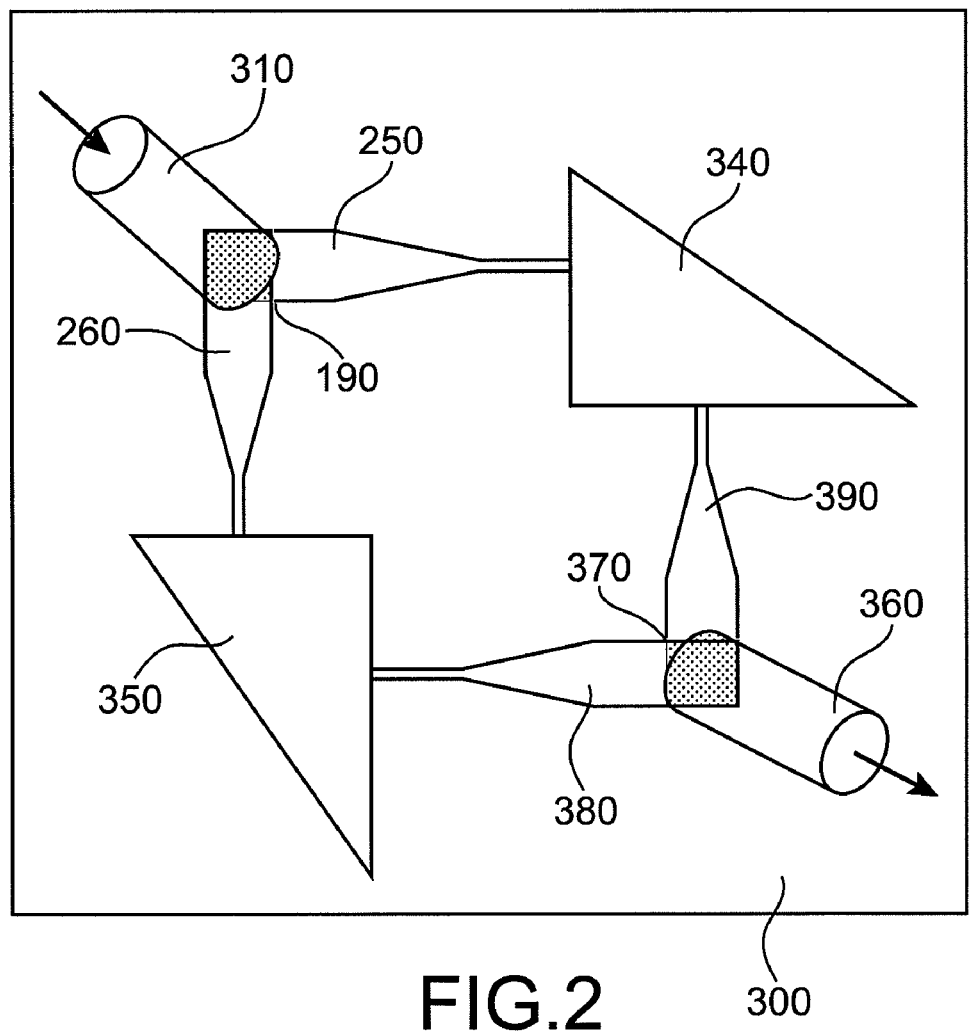
Figure 3:
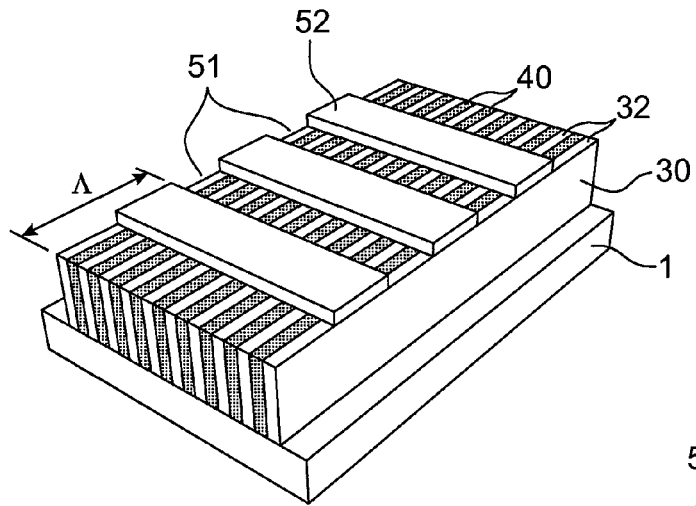
FIG. 3 shows a perspective top view of an exemplary coupling device according to the invention.

As shown in FIG. 3, the first layer 30 can include slots of uniform width spaced apart periodically, the slots passing through the entire thickness of the first layer. For example, the first layer can have a thickness of 220 nm, the width of the slots being 80 nm and the period between the slots being 120 nm. In FIG. 3, the slots produced in the first layer 30 are filled in with a different material: strips 32 and strips 40 made of different materials are thus obtained.

As regards the second layer, it likewise includes slots 51 of uniform width, which are spaced apart periodically and arranged perpendicular to the slots of the first layer. In this way, strips 52 perpendicular to strips 32 are obtained. The second layer, for example, can have a thickness of 150 nm, the width of the slots 51 being 300 nm and the period between the slots being 400 nm.

It is noted that the slots 51 of the second layer have a much greater period Λ and width than those of the first layer. This is explained by the fact that the structuring of the first layer 30 has the purpose of compensating for the birefringence of the first layer, while the structuring of the second layer enables the optical wave to be diffracted.

It is to be noted that the first and second layers can be made of different materials or of a single material.

Figure 4:
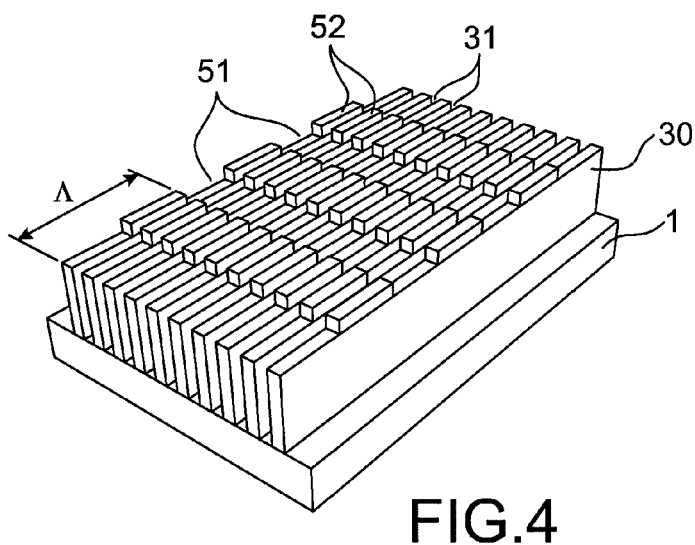
FIG. 4 shows a perspective top view of another exemplary coupling device according to the invention.

In FIG. 4, a coupling device is shown which is similar to the one shown in FIG. 3, with the difference being that the second layer comprises both second patterns 51 (wide slots), as well as the first patterns 31 of the first layer (narrower slots), thereby enabling narrower strips 52 to be obtained. In this exemplary embodiment, the size of the second patterns is chosen to be sufficiently small so that they do not cause any diffraction effect either in the first layer or in the second layer (in this case, the layer comprising both the first patterns and the second patterns), the diffraction effect being ensured by the diffraction grating inscribed in the second layer and formed by the second patterns 51 (wide slots).

Figure 5:
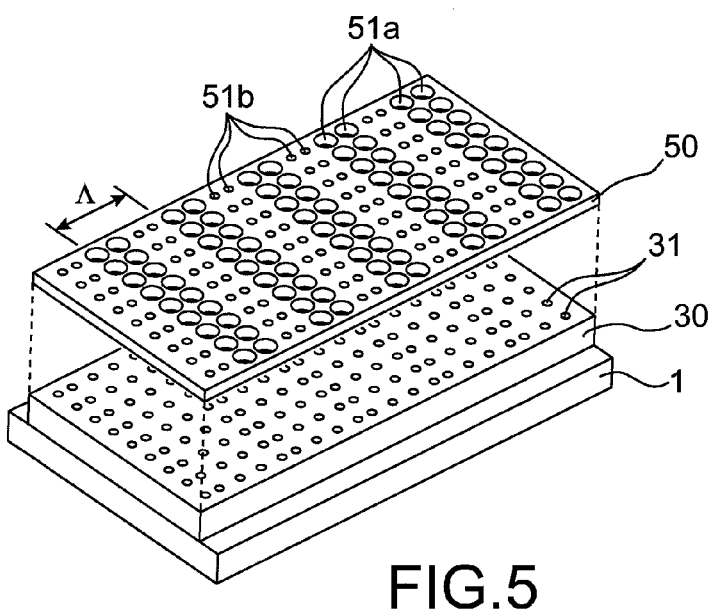
FIG. 5 shows an exploded and perspective top view of another exemplary coupling device according to the invention.

In FIG. 5, the first layer 30 comprises first patterns 31 which, for example, are holes of uniform circular cross-section, which are spaced apart from one another evenly in periodic rows, and the second layer 50 comprises second patterns ($51a$, $51b$), which are holes of circular cross-section having two different diameters, and which are arranged in periodic rows. In this case, the diffraction grating is obtained in the second layer by placing two rows of holes having the largest diameter, followed by two rows of holes having the smallest diameter, and so on and so forth. The variation in diameter induces a local variation in index in the period required to create a diffraction grating and to therefore couple the light in the first layer.

The steps of the method of producing a coupling device according to the invention will now be described in detail.

Figure 6A:
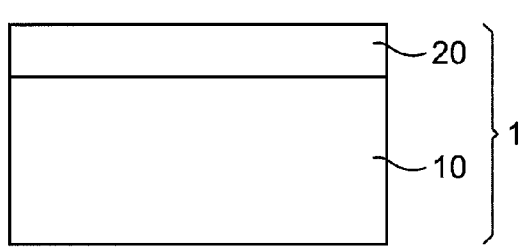
FIGS. 6A to 6F show the steps of the method of manufacturing the coupling device according to the invention.

First of all, a suitable support substrate 1 is prepared. In our example, the support substrate 1 includes a substrate 10 covered by an upper layer 20 (FIG. 6A). The surface of the support substrate which will be in contact with the first layer must have a lower index of refraction than that of the first layer, so as to prevent the light from being evacuated into the support substrate. For example, the support substrate 1 can consist of silicon substrate 10 covered by a layer of silicon dioxide having a thickness of approximately 1 micrometer.

Figure 6B:
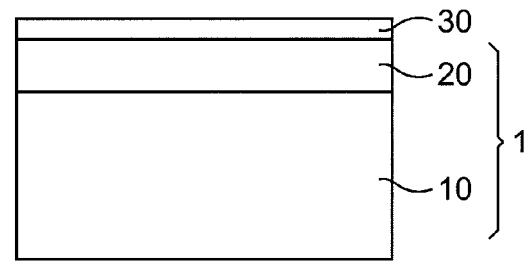

A first layer 30 (FIG. 6B) is deposited onto a support substrate 1. The material of the first layer can be chosen from amongst a semiconductor material, a dielectric material, or a mixture of the two. For example, the guide can be made of crystalline or amorphous silicon, InP, germanium or phosphorous-doped silica . . .

In our example, the first layer 30 is a layer of polycrystalline silicon having a thickness of between 200 nanometers and 1 micrometer.

Figure 6C:
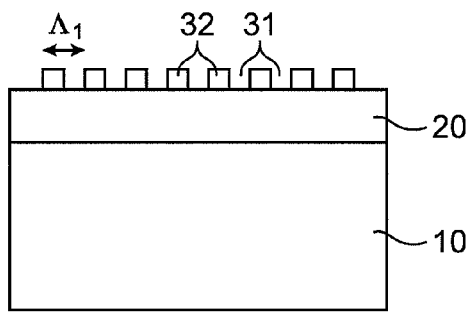
Figure 6D:
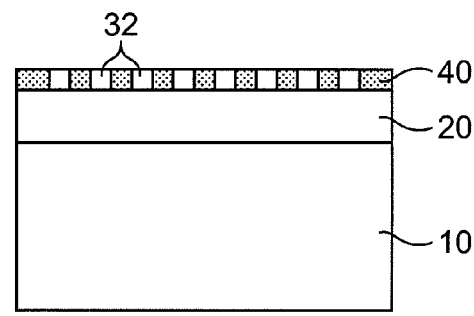

Next, the structuring of the first layer 30 is defined, which will serve to compensate for the dispersion in polarization, while producing the first patterns 31 (FIG. 6C). In our example, the first patterns 31 are slots, and strips 32 are thus obtained.

Figure 8:
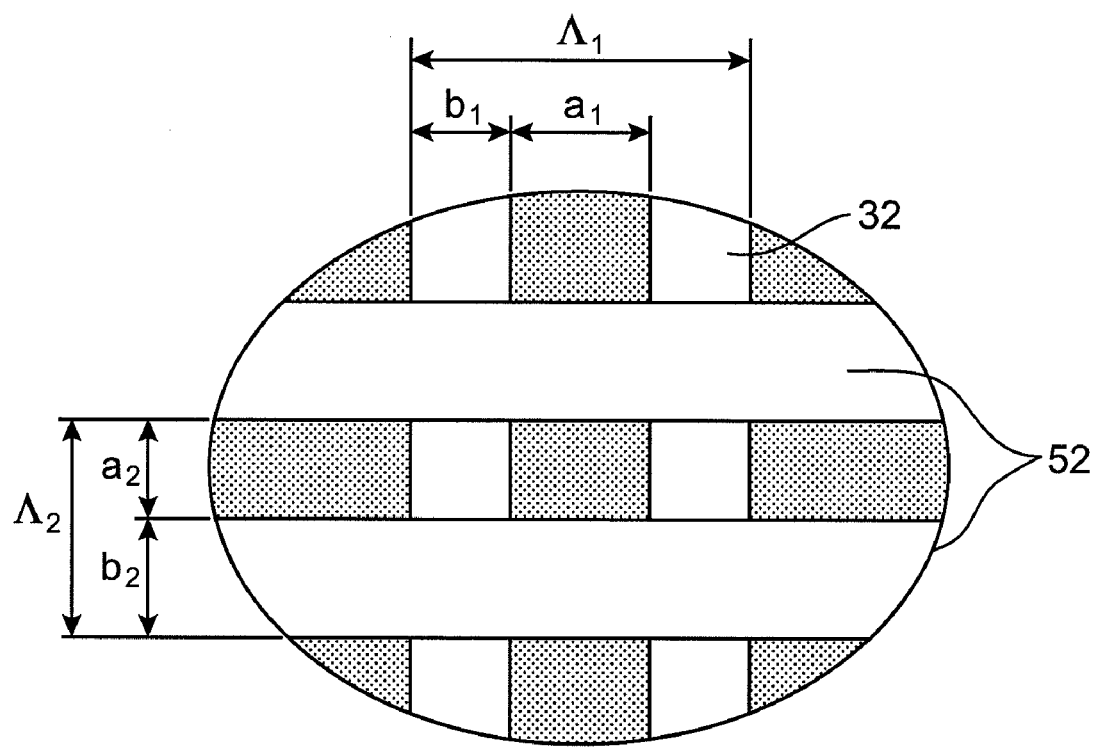
FIG. 8 shows a detail of FIG. 7.

The slots, for example, have a width $a_1$ of 80 nm, and are spaced apart by a pitch $b_1$ of 20 nm. The period $\Lambda_1$ of the slots is then 100 nm (FIG. 8).

Figure 6E:
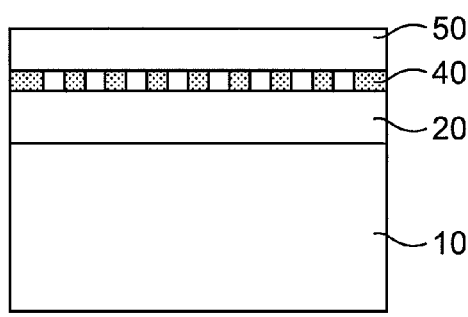

The slots 31 can be left empty or filled with a fluid or a material 40 which is different from the material of the first layer 30. The addition of a fluid or material to the first patterns makes it possible to modify the birefringence of the first layer. In this way, for example, it is possible to produce a structuring of the first layer which enables a non-zero birefringence B to be obtained, and the addition of a specific material into the first patterns will then enable a zero birefringence to be obtained. In our example, we filled in the slots 31 with silicon dioxide (FIG. 6E). To accomplish this, a layer of silicon dioxide having a thickness of 1.5 micrometers is deposited, and the layer is planarized by mechanical-chemical polishing so as to remove the silicon dioxide protruding from the slots 31.

Figure 7:
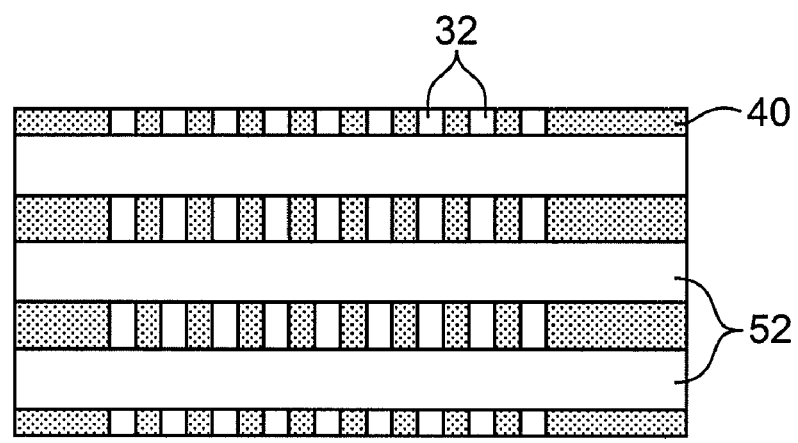
FIG. 7 shows a top view of FIG. 6e.

Next, a second layer 50 is formed on the first structured layer 30 (FIG. 6E). In our example, a layer of $Si_3N_4$ having a thickness of 50 nanometers is deposited. This second layer 50 is then structured; in our example, the second patterns 51 are slots, and strips 52 are thus obtained. The slots have a width $a_2$ of 300 nm, and are spaced apart by a pitch $b_2$ of 60 nm, and have a period $\Lambda_2$ of 360 nm (FIG. 8). It is noted that the slots 31 of the first layer and the slots 51 of the second layer are produced such that they intersect at a 90° angle (FIG. 7). This makes it possible to preserve the direction and polarization of the beam once coupled in the device.

A coupling device 100 according to the invention is then obtained.

The second patterns of the second layer, like the first patterns of the first layer, can be left empty or filled with a fluid or material which is different from the material of the second layer.

Figure 6F:
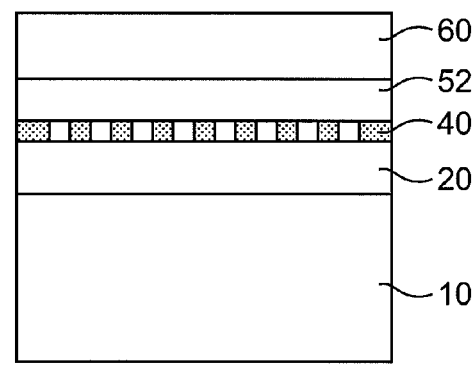

In addition, a protective layer 60 may optionally be deposited on the second structured layer, as shown in FIG. 6F. This protective layer enables the patterns to be protected so as to retain the same geometric parameters over time.

The structuring of the first and second layers is carried out according to conventional techniques known to a person skilled in the art, e.g., via lithography and etching.

The first patterns and the second patterns do not have the same function and therefore do not have the same dimensions. The first patterns make it possible to compensate for the birefringence of the first layer until a substantially zero birefringence is obtained, while the second patterns serve to create a diffraction grating enabling the light to be diffracted.

The width of the first patterns $a_1$ must be between 30 nm and 100 nm, the space between the first patterns $b_1$ must be between 30 nm and 100 nm, and the period $\Lambda_1$ between the first patterns is between 50 nm and 200 nm.

The width of the second patterns $a_2$ must be between 200 nm and 500 nm, the space between the second patterns $b_2$ must be between 50 nm and 300 nm, and the period $\Lambda_2$ between the second patterns is between 250 nm and 800 nm.

The coupling device according to the invention has numerous advantages.

It enables a suitable coupling to be obtained (with insertion losses less than 3 dB) for all polarizations within one and the same coupling device, without having to separate the polarizations and by processing the two polarization states at the same time.

The coupling device according to the invention can be used in numerous fields. It can thus be used in optoelectronics, for producing integrated optical optoelectronic components using planar optical waveguides which enable light to be coupled towards these guides or from these guides, for producing optoelectronic components involving optical-fiber data transmission networks, for producing photonic circuits such as planar waveguides, micro-nano-structured circuits using low or high refractive index contrast planar waveguides (e.g., a core made of silicon or another semiconductor material, and a cladding layer made of a dielectric material).

Optical circuits can thus be produced comprising both a coupling device and a planar optical waveguide, by producing the waveguide from a portion of the first layer used to produce the coupling device. In this way, contrary to the prior art, and in particular document [1], the optical circuits comprising waveguides and coupling devices according to the invention are space-saving, given that it is no longer necessary to double the waveguides for each state of polarization.

BIBLIOGRAPHY

[1] EP 1 353 200, filed on 9 Apr. 2003.

The invention claimed is:

1. An optical coupling device (100) intended for optically coupling an optical wave of a first optical component towards a second optical component, said coupling device comprising:
a support substrate (1),
a first layer (30) arranged on the support substrate and comprising first patterns (31) produced within the thickness of said first layer, said first patterns being arranged in parallel and periodic rows,
a second layer (50) arranged on the first layer (30) and comprising second patterns (51) passing through the thickness of said second layer, said second patterns being arranged in parallel and periodic rows,
wherein the direction of periodicity of the rows of the first patterns (31) is perpendicular to the direction of periodicity of the rows of the second patterns (51),
wherein the rows of the first patterns extend over a distance greater than or equal to the wavelength in the void of the optical wave intended to be coupled,
wherein the first patterns have a width less than or equal to a tenth of the wavelength of the optical wave intended to be coupled, and the period of these first patterns is between 50 nm and 1 µm, the width being the dimension of a pattern in the direction of periodicity,
and wherein the second patterns are arranged so as to form a periodic diffraction grating.

2. The optical coupling device of claim 1, wherein the diffraction grating formed by the second patterns (51) has a period of between 300 nm and 1 µm.

3. The optical coupling device of claim 1, wherein the first (31) and second (51) patterns are protuberances and/or recesses.

4. The optical coupling device of claim 3, wherein the protuberances are chosen from amongst columns or ribs.

5. The optical coupling device of claim 3, wherein the recesses are chosen from amongst holes or slots.

6. The optical coupling device of claim 4, wherein the protuberances have a cross-section chosen from amongst a circular cross-section, a square cross-section or a rectangular cross-section.

7. The optical coupling device of claim 5, wherein the recesses have a cross-section chosen from amongst a circular cross-section, a square cross-section or a rectangular cross-section.

8. The optical coupling device of claim 1, wherein all of the first and/or second patterns of a single row have the same width.

9. The optical coupling device of claim 4, wherein at least one row from amongst the rows of first and second patterns comprises a single pattern, this pattern being a rib.

10. The optical coupling device of claim 5, wherein at least one row from amongst the rows of first and second patterns comprises a single pattern, this pattern being a slot.

11. The optical coupling device of claim 9, wherein all of the rows of first and/or second patterns comprise a single pattern, the pattern being a rib.

12. The optical coupling device of claim 10, wherein all of the rows of first and/or second patterns comprise a single pattern, the pattern being a slot.

13. The optical coupling device of claim 1, wherein the first patterns (31) of the first layer (30) are likewise present in the second layer (50).

14. The optical coupling device of claim 1, wherein the second patterns are columns or holes having different diameters a and b, the columns or holes of diameter a (51*a*) and the columns or holes of diameter b (51*b*) being in separate rows, and the rows of patterns of diameter a and the rows of patterns of diameter b being repeated periodically.

15. The optical coupling device of claim 1, wherein the first patterns are filled with a fluid or a solid material (40), which is different from the material of the first layer (30).

16. The optical coupling device of claim 1, wherein the second patterns (51) are filled with a fluid or a solid material, which is different from the material of the second layer (50).

17. The optical coupling device of claim 15, wherein the solid material used to fill the first patterns is chosen from amongst the oxides or nitrides.

18. The optical coupling device of claim 16, wherein the solid material used to fill the second patterns is chosen from amongst the oxides or nitrides.

19. The optical coupling device of claim 17, wherein the solid material used to fill the first patterns is chosen from amongst $SiO_2$, $TiO_2$, $Si_3N_4$.

20. The optical coupling device of claim 18, wherein the solid material used to fill the second patterns is chosen from amongst $SiO_2$, $TiO_2$, $Si_3N_4$.

21. The optical coupling device of claim 1, further comprising a reflecting structure placed between the support substrate and the first layer, this reflecting structure being chosen from amongst a Bragg mirror, a layer of metal or a photonic crystal layer.

22. An optical circuit comprising the optical coupling device (100) of claim 1, as well as a planar optical guide, said planar optical guide being contiguous with the first layer of the coupling device.

23. A method of producing the coupling device of claim 1, said method including the following steps:
supplying a support substrate (1),
supplying a first layer (30) on the support substrate, said first layer comprising first patterns (31),
supplying a second layer (50) on the first layer, said second layer comprising second patterns (51).

24. The method of producing a coupling device of claim 23, wherein the first (second) layer comprising the first (second) patterns is supplied by depositing the first (second) layer and by etching the first (second) patterns into said first (second) layer.

25. The method of producing a coupling device of claim 23, wherein the first layer (30) comprising the first patterns (31) and the second layer (50) comprising the second patterns (51) are supplied by depositing one and the same layer on the support substrate, by etching the first patterns into the thickness of the layer, and then by etching the second patterns on the surface of the layer.

26. A method of producing an optical circuit comprising the coupling device of claim 1, and a planar waveguide, said method comprising the following steps:
a) supplying a support substrate,
b) supplying a first layer on the support substrate, said first layer including a region comprising the first patterns,
c) supplying a second layer on the region of the first layer, said second layer comprising the second patterns.

27. The method of producing an optical circuit of claim 26, wherein step b) is carried out by depositing a first layer on the support substrate and by etching the first patterns into said first layer, and step c) is carried out by depositing a second layer on the region of the first layer comprising the first patterns and by etching the second patterns into said second layer.

28. The method of producing an optical circuit of claim 26, wherein steps b) and c) are carried out by depositing a layer on the support substrate, by etching the first patterns into the thickness of said layer, by surface-etching the second patterns in a region of the layer and by surface-etching the remainder of the second layer.

29. The method of producing an optical circuit of claim 26, wherein step b) is carried out by depositing a first layer on the support substrate and by etching the first patterns into a region of said first layer, and step c) is carried out by depositing a second layer, by etching the second patterns into a region overhanging the region of the first layer and by completely etching the second layer outside of said region of the second layer.

* * * * *